US006657190B2

(12) United States Patent
Hanson et al.

(10) Patent No.: US 6,657,190 B2
(45) Date of Patent: Dec. 2, 2003

(54) VARIABLE POTENTIAL ION GUIDE FOR MASS SPECTROMETRY

(75) Inventors: Curtiss D. Hanson, Cedar Falls, IA (US); Paul Trent, Waterloo, IA (US)

(73) Assignee: University of Northern Iowa Research Foundation, Cedar Falls, IA (US)

( * ) Notice: Subject to any disclaimer, the term of this patent is extended or adjusted under 35 U.S.C. 154(b) by 31 days.

(21) Appl. No.: 09/885,648

(22) Filed: Jun. 20, 2001

(65) Prior Publication Data

US 2002/0195557 A1 Dec. 26, 2002

(51) Int. Cl.[7] .......................... B01D 59/44; H01J 49/00

(52) U.S. Cl. .................... 250/287; 250/282; 250/396 R

(58) Field of Search ................................ 250/287, 282, 250/396 R

(56) References Cited

U.S. PATENT DOCUMENTS

| | | | | |
|---|---|---|---|---|
| 6,013,913 A | * | 1/2000 | Hanson | 250/287 |
| 6,204,500 B1 | * | 3/2001 | Whitehouse et al. | 250/287 |
| 6,417,511 B1 | * | 7/2002 | Russ et al. | 250/292 |

* cited by examiner

*Primary Examiner*—John R. Lee
*Assistant Examiner*—Paul M. Gurzo
(74) *Attorney, Agent, or Firm*—Allan L. Harms

(57) ABSTRACT

A variable potential ion guide for placement within the reflectron of a time-of-flight mass spectrometer includes an elongate resistive electrode placed axially within the reflectron. The electrode may be a non-conductive monofilament coated with a resistive polymer coating, with one end of the electrode coupled to a high potential source, the electrode carrying a potential gradient along its length.

20 Claims, 10 Drawing Sheets

Theoretical Potential Energy Surface

Ion Detection without Variable Potential Particle Guide

VARIABLE POTENTIAL ION GUIDE FOR MASS SPECTROMETRY

STATEMENT REGARDING FEDERALLY SPONSORED RESEARCH OR DEVELOPMENT

Not Applicable.

FIELD OF THE INVENTION

This invention relates to the field of mass spectrometry and in particular to a variable potential ion guide which permits increased transmission and enhanced ion analysis in mass spectrometry.

BACKGROUND OF THE INVENTION

The field of mass spectrometry encompasses an area of analytical chemistry which analyzes substances by measuring the molecular mass of the constituent compounds. With the increasing importance of biomolecule analysis, time-of-flight mass spectrometry (TOF-MS) is becoming more and more popular in both industrial and academic labs. Time-of-flight mass spectrometers have shown sensitivity for samples in the range of a few hundred attomoles and have a mass range that is only limited by the ionization method. With the introduction of $^{252}$Cf plasma desorption techniques and matrix assisted laser desorption ionization (MALDI), this mass range was extended into the useful range for biomolecule study. Because of the growing interest in biochemical pathways and identification of biomolecules that occur in only trace amounts, time-of-flight instruments are becoming the instrument of choice in analytical labs.

The principle of mass analysis is that ions of the same kinetic energy will have different velocities based on their mass. The fundamental equation used in time-of-flight mass spectrometry is as follows:

$$KE=\tfrac{1}{2}\,mv^2$$

The ability to accurately determine the mass of a specific sample ion depends on how well defined the kinetic energy is and the ability to determine the differences in the time-of-flight of the ions between two fixed points. Early instruments built for time-of-flight mass spectrometry improved the resolution of the instrument by increasing the length of the flight tube (FIG. 1). By increasing the distance between the source and the detector, ions having small differences in velocity were allowed to become separated in space. Typical flight distances for commercial instruments were often two or three meters long to provide adequate resolution.

Many successful time-of-flight mass spectrometry instrument designs utilize an ion extraction surface that is perpendicular to the ion optical axis. This geometry prevents the loss of mass resolution due to spatial distribution effects related to sample position and the laser focal size. (Cotter, R. *Biomed. Environ. Mass Spectrom.,* 1989, 18, 513–532). However, using this geometry, ions can acquire velocity components perpendicular to the ion optical axis, making it difficult to focus ions onto the detector. Although large acceleration potentials have been implemented to limit the effects of the initial kinetic energy distribution of extracted ions, velocity components perpendicular to the flight axis result in ion loss as the beam diverges away from a detectable axis.

A major advance in kinetic energy focusing was the introduction of the ion mirror or ion reflector first described by Mamyrin (Mamyrin, B. A.; Karataev, V. I.; Shmikk, D. V.; Zagulin, V. A.; *Sov. Phys.*-JETP, 1973, 37, 45–48.). With this approach, ions penetrate a retarding field at a depth proportional to their velocities. Ions with a high velocity travel a longer distance before exiting the field which creates tighter isomass ion packets. To simplify focusing characteristics and minimize ion loss, initial designs minimized the angle of incidence relative to the ion reflector. Although such ion mirrors result in greatly improved mass resolution, field lines in the center of the ion mirror tend to expand and redirect ion trajectories away from the flight axis. To attempt to control inhomogeneous field lines, multiple electrodes are added in an attempt to refine the electric field in the center of the ion mirror.

Another technique used to improve resolution is the lengthening of the flight region, but again, the extra length makes it more difficult to transport ions to the detector. Therefore, a significant loss of sensitivity can be experienced when going to the longer drift region. This loss in sensitivity was addressed by Oakey and Macfarlane with the introduction of an electrostatic particle guide. (Oakey, N.; Macfarlane, R.; *Nucl. Instrum. Methods,* 1967, 49, 220–228). The electrostatic particle guide (EPG) is an isolated wire electrode that spans the length of the drift region of the flight tube, creating a potential field in the center which effectively "guides" ions to the detector. Ions that are accelerated in a direction slightly perpendicular to the ion optical axis are captured in the potential field and transported to the detector resulting in a dramatic improvement in sensitivity (Geno, P.; Macfarlane, R.; *Int. J. Mass Spectrom. Ion Proc.* 1986, 74, 43–57: Brown, R.; Gilrich, N.; *Rapid Commun. Mass Spectrom.* 1992, 6, 697–701).

In addition to improved transmission efficiency of ions, Macfarlane later demonstrated the utility of the EPG for elimination of neutrals (Wolf, B.; Macfarlane, R.; *J.A.S.M.S.* 1992, 3, 706–715) and ion elimination (Geno, P.; Macfarlane, R.; *Int. J. Mass Spectrom. Ion Proc.* 1986, 74, 43–57). Recently, as described by Just and Hanson (Just, C. L.; Hanson, C. D.; *Rapid Comm. Mass Spectrom.* 1993, 7, 502–506), selective ion elimination has been accomplished using a pulsed bipolar EPG. This approach was shown to effectively eliminate intense, low-mass background ions while increasing the transmission efficiency of higher mass ions. This technique was also found to increase the signal-to-noise ratio by reducing the saturation of the detector. Furthermore, an EPG does not introduce radially inhomogeneous field lines and therefore does not result in positionally dependent ion acceleration. A bipolar pulsed electrostatic particle guide can therefore perform ion isolation by utilizing a multi-pulse sequence. In such a sequence, the first pulse would be used to eliminate low mass ions while subsequent pulses could be used to eliminate unwanted ions after the ions to be studied have arrived at the detector. In an experiment using a bipolar pulsed EPG to isolate ions, ions were isolated on the basis of their radial flight times and then selected ions were analyzed using the axial flight times. By using this approach, ion isolation can be performed with high resolution while maintaining high ion transmittance.

In my U.S. Pat. No. 6,013,913, an improved coaxial time-of-flight mass spectrometer is described which utilizes switched reflectrons at opposing ends of the spectrometer to cause particles to be reflected repeatedly along the same axis before allowing the particles to reach the detector. Using fast electrostatic switches, it is possible to orient the source, detector and analyzers on the same axis of ion motion. This geometry permits ions to make multiple passes through the drift region as they are continuously reflected between the ion mirrors. This creates a continuous zero angle reflecting time-of-flight instrument that maintains high ion transmission while providing improved resolution. Because the reflection fields are not at a constant potential, the single potential created by an EPG is inconsistent with the field requirements. Therefore, ions must leave the EPG guided flight region when entering into the reflectron region. Because of this, ions tend to diverge in the reflectron region and are lost. This effect ultimately limits the number of passes that an ion can effectively make within a coaxial reflectron due to ion loss in the reflectron regions.

In a device developed after invention of the coaxial time-of-flight mass spectrometer of U.S. Pat. No. 6,013,913, the particles under examination are reflected by a static reflectron on one end of a coaxial flight region, with the opposing reflectron being switched to allow the particles under examination to be passed to the detector when selected reflections have been accomplished. However, unlike the device described in U.S. Pat. No. 6,013,913, the single switched coaxial reflectron device suffers from substantial degradation of the yield of detected particles because the particles being reflected in the static reflectron are drawn toward the outer walls of the time-of-flight mass spectrometer in the static reflectron region due to the parabolic course the particles define as they reverse direction in the static reflectron and due to flux within the static reflectron.

The problems described above can be solved by the creation of a single particle guide that can be placed into variable potential reflection fields and can control the trajectories of ions in the center of the flight tube. This type of particle guide would have to be able to create variable potentials along a single surface to work in concert with the external electrodes to produce electric fields that would permit the desired analysis but also reduce unwanted ion scatter and reduced signal strength.

SUMMARY OF THE INVENTION

The invention presented here provides an improvement to the prior art by providing a unique electrode design that permits increased transmission and enhanced ion analysis in mass spectrometry. In accordance with the preferred embodiment, this innovation utilizes a variable potential field over the length of the single electrode by using user controlled resistive coating as the conductive surface. By varying the conductivity of the surface of the electrode, it is possible to use the single electrode as a voltage dividing device which alters the potential field generated by the EPG at different locations. This electrode can therefore be used to create any potential surface desired at the center of the spectrometer near the ion flight region, compared to using multiple external electrodes that attempt to control the ion flight. Such an electrode could therefore be created that creates a reflectron having electric fields that constantly redirect the ions back towards the flight axis, eliminating the typical divergence and subsequent ion loss. By creating an electric field that is lower in potential at the center of the flight axis, ions would be effectively transmitted through an ion mirror region thereby enhancing the sensitivity of the device. Furthermore, because this would permit multiple passes to be effectively performed, the net flight length would be increased leading to an increase in resolution. To reduce the problems associated with ion collision with the electrode surface, the radial dimensions of the electrode should be reduced as much as possible. The preferred embodiment of the invention would be an isolated filament electrode having a small radial diameter, whose length spans the length of the analysis region. By coating the surface with a resistive coating, potential fields can be generated in the center that guides ions to the detector with high transmission efficiency. Ions that are diverging from the flight axis are captured in the potential field and transported to the detector resulting in an improvement in sensitivity and resolution.

The variable potential ion guide is disposed substantially axially within the reflectron region of the device and comprises a small diameter filament of non-conductive material coated with a uniform resistive coating, the filament coupled at its ends to different voltage potentials whereby the potential upon the variable potential ion guide differs along its length. In the preferred embodiment device, a monofilament polymer with a diameter of approximately two millimeters, such as fishing line, is coated uniformly with a resistive polymer. The variable potential ion guide is coupled to a charged source such that the highest potential along the variable potential ion guide is present at the end of the ion guide positioned axially to the reflectron electrode at the highest potential, the ion guide being relatively attractive to the ions moving within the reflectron. Preferably, the variable potential ion guide is axially coupled to a homogeneously charged electrostatic particle guide disposed substantially axially within the field free drift region of the time-of-flight mass spectrometer.

It is therefore an object of the invention to provide improved efficiency of particle analysis in a time-of-flight mass spectrometer. It is another object of the invention to provide an improved time-of-flight mass spectrometer which achieves increased transmission and enhanced ion analysis. It is a further object of the invention to provide a time-of-flight mass spectrometer having a static reflectron which reduces the incidence of particle deflection from the axis of the flight region. It still a further object of the invention to provide a time-of-flight mass spectrometer with a reflectron region having a variable potential ion guide located axially within it. It is yet another object of the invention to provide a time-of-flight mass spectrometer with improved sensitivity and resolution. These and other desirable objects will be understood from review of the detailed description of the invention which follows.

DETAILED DESCRIPTION OF THE INVENTION

Figure 1:
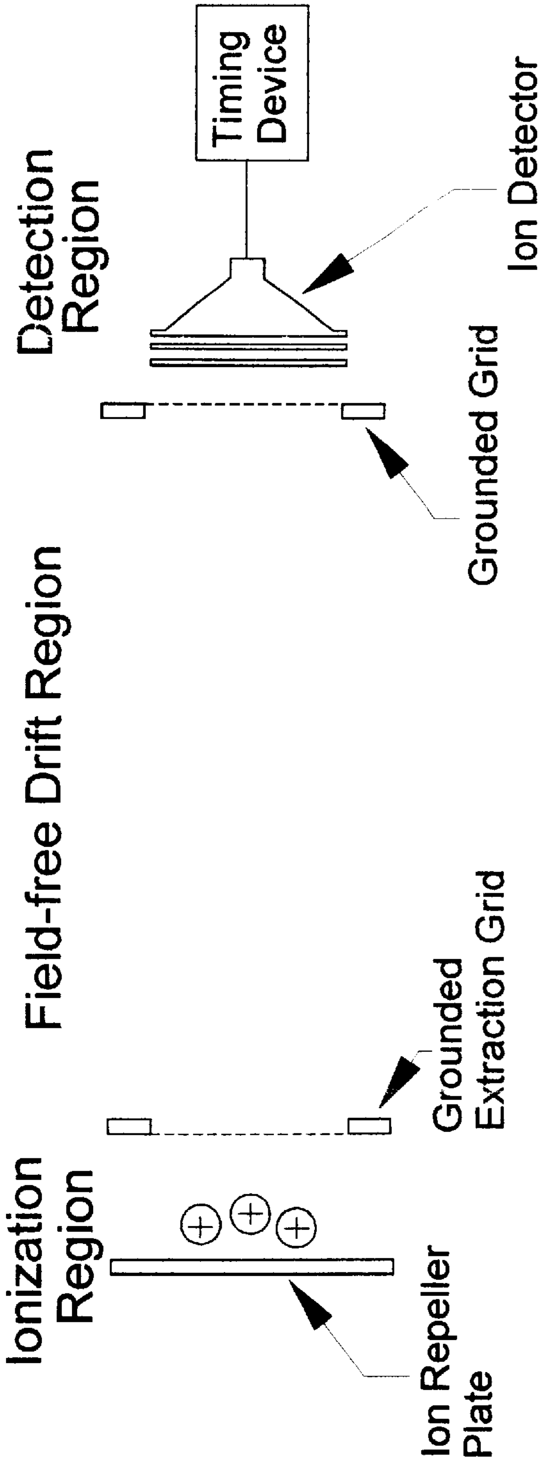
Prior Art Figure 1
FIG. 1 is a simplified schematic diagram of a simple linear time-of-flight mass spectrometer.
Figure 2:
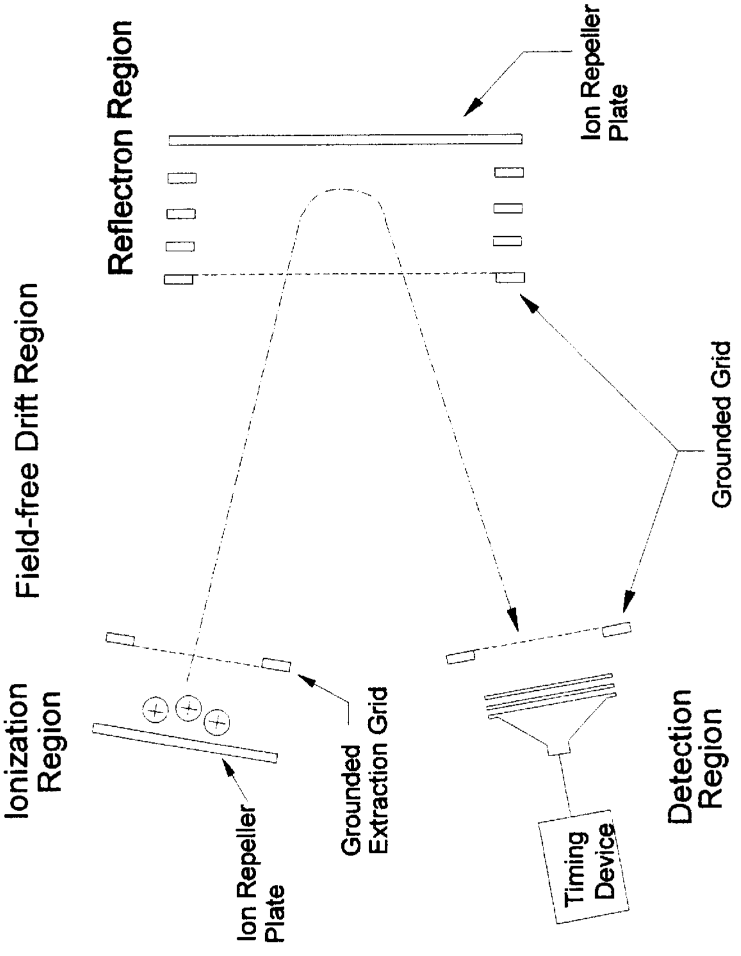
Prior Art Figure 2
FIG. 2 is a simplified schematic diagram of a time-of-flight mass spectrometer employing an ion reflector for kinetic energy focusing.
Figure 3:
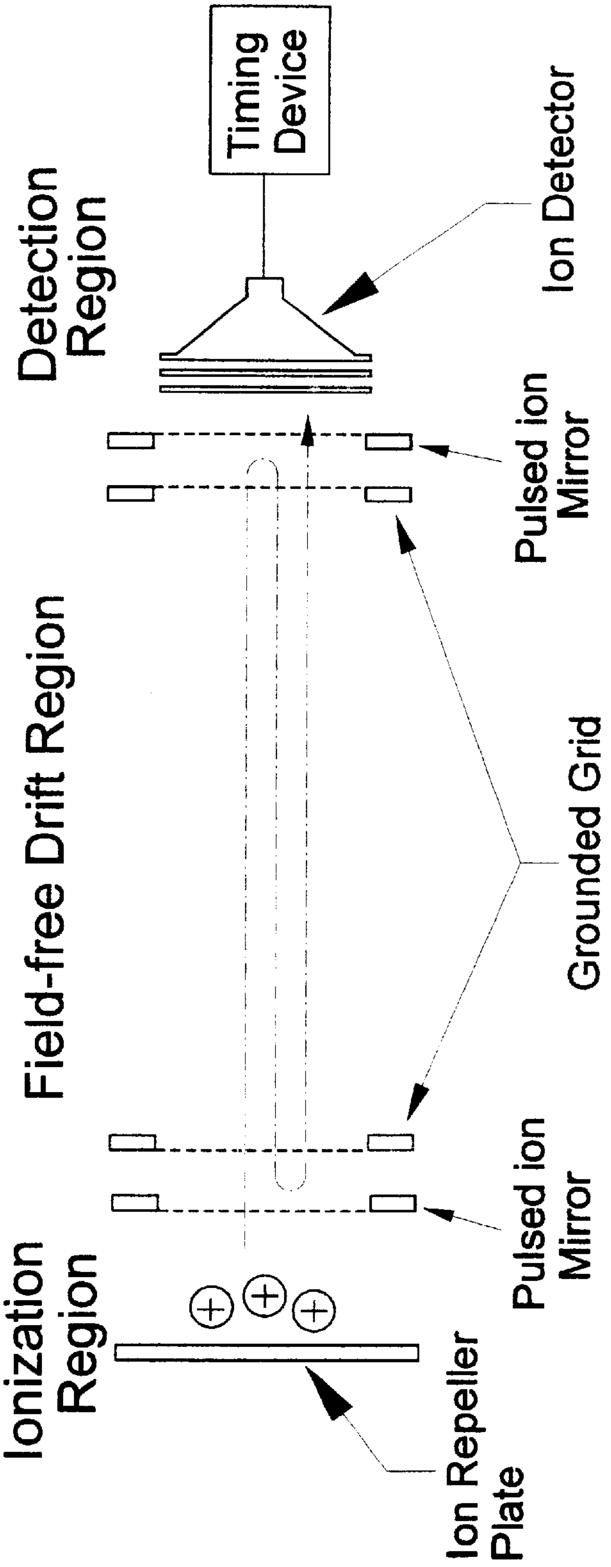
Prior Art Figure 3
FIG. 3 is a simplified schematic diagram of a time-of-flight mass spectrometer employing a coaxial ion reflector for kinetic energy focusing with zero-angle reflectance.
Figure 4:
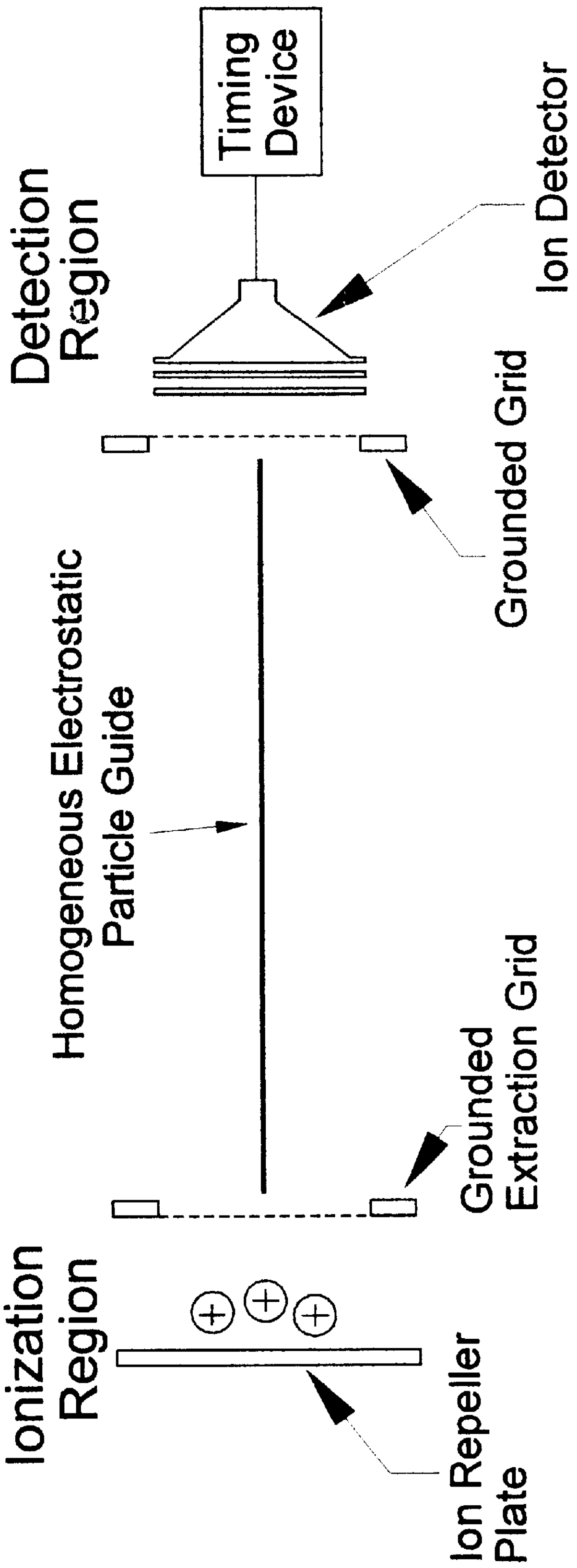
Prior Art Figure 4
FIG. 4 is a simplified schematic diagram of a time-of-flight instrument utilizing an electrostatic ion guide electrode.

A schematic of a simple prior art time-of-flight mass spectrometer is depicted in FIG. 1. Ions are formed in an ion source region and repelled by a charged plate. The ions are accelerated to the flight region of the mass spectrometer where they separate on the basis of the different velocities resulting from their different masses. Their time-of-flight is recorded by a detector placed at the end of the flight region. FIG. 2 and FIG. 3 illustrate prior art improvements to the resolution of the time-of-flight mass spectrometer by increasing the length of the flight region and the incorporation of ion reflectors. FIG. 4 illustrates a prior art time-of-flight mass spectrometer having a fixed potential, static electrostatic ion guide that creates a potential field in the center of the flight region to continually redirect ion trajectories back to the center of the flight axis.

The present invention recognizes the utility of the ion guide and its inherent improvements in ion transmission efficiency. The invention described here creates a novel ion guide that creates a variable potential field over the length of the single electrode by using user-controlled resistive coating as the conductive surface. In this embodiment, a single electrode can be used in a constantly changing field by changing the resistivity of the surface to alter the resultant voltage. By varying the voltage along the electrode's surface, variable electric fields used for transmission or analysis can be created by a single electrode.

The present invention recognizes the utility of the ion guide and its inherent improvements in ion transmission efficiency. The invention described here creates a novel ion guide that creates a variable potential field over the length of the single electrode by using user-controlled resistive coating as the conductive surface. In this embodiment, a single electrode can be used in a constantly changing field by changing the resistivity of the surface to alter the resultant voltage. By varying the voltage along the electrode's surface, variable electric fields used for transmission or analysis can be created by a single electrode.

Figure 5:
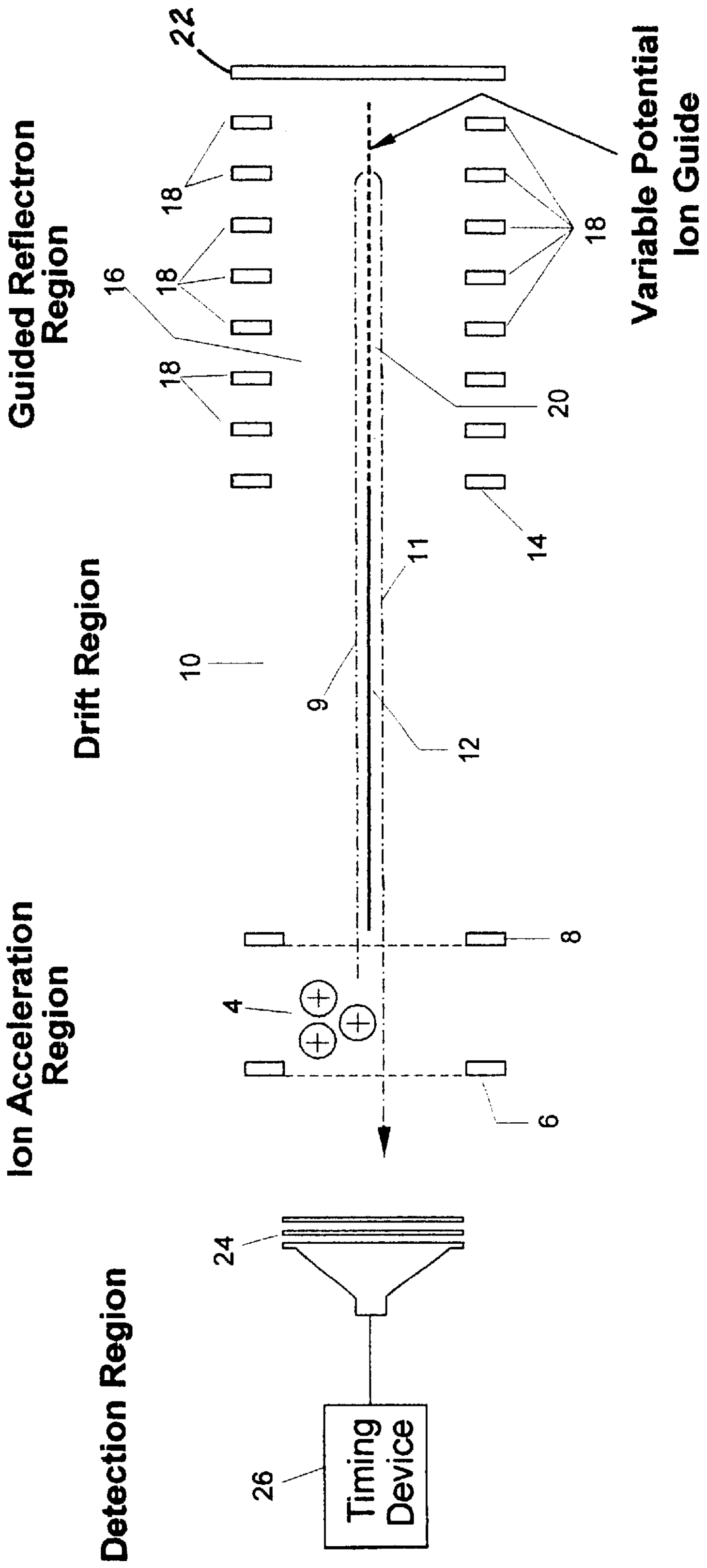
FIG. 5 is a simplified schematic diagram of a time-of-flight instrument utilizing a variable potential ion guide.
Figure 6:
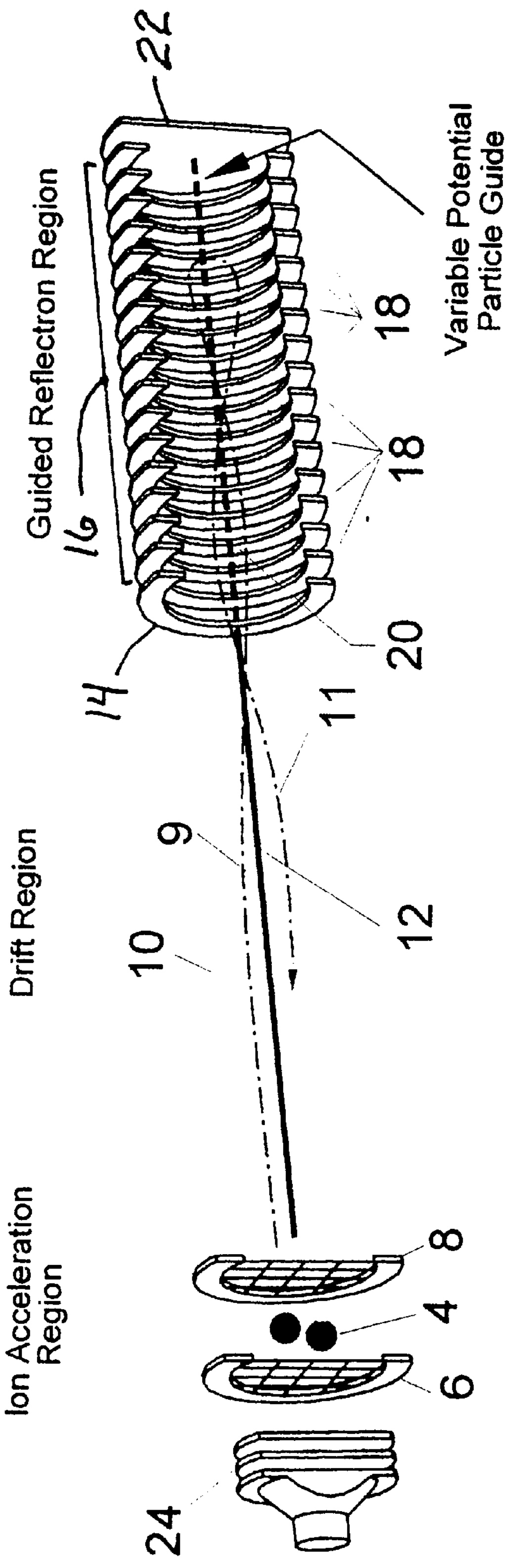
FIG. 6 is an isometric diagram of a time-of-flight instrument utilizing a variable potential ion guide.

According to the present invention, a time-of-flight mass spectrometer is shown in FIGS. 5 and 6. Charged ions 4 are injected or produced adjacent ion repeller 6 and are repelled from the positive charge on ion repeller 6 past extraction grid 8 and into drift region 10 generally along first flight path 9. Drift region 10 is provided with an axial fixed potential electrostatic particle guide 12 which extends substantially the length of the drift region 10, that is, from extraction grid 8 to the boundary of guided reflectron region 16. Electrostatic particle guide 12 carries a fixed attracting charge relative to ions 4 in order to urge them to follow the axis of drift region 10. Ions 4 drift toward grounded electrode 14 and pass therethrough into guided reflectron region 16 which is encompassed by a laterally arranged series of variably charged annular electrodes 18 with each succeeding charged electrode 18 having a higher electrostatic potential such that ions 4 entering guided reflectron region 16 are increasingly repelled by charged annular electrodes 18 carrying successively higher charges. Ions 4 are redirected along return path 11 toward the ion extraction grid 8 such that they do not strike end plate 22 of the instrument. The guided reflectron region 16 includes a substantially axially positioned variable potential ion guide 20 comprising a substantially linear, resistive electrode 28 coupled to a charged source.

Figure 10:
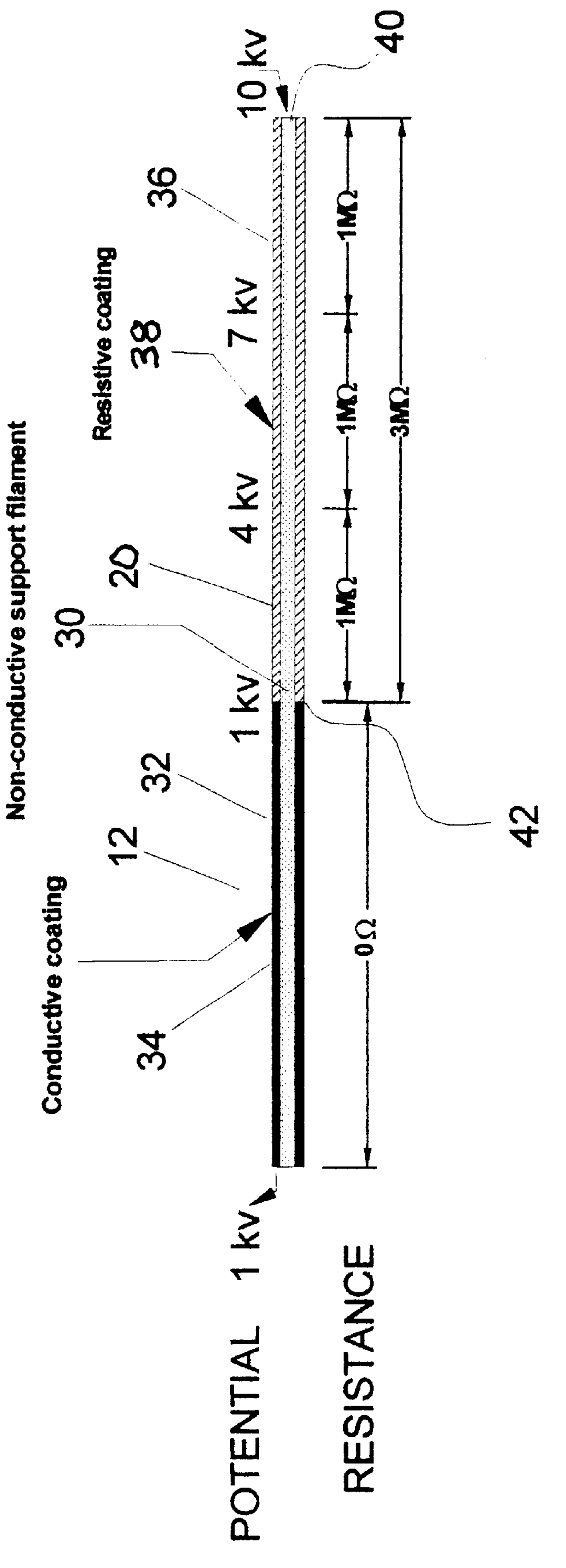
FIG. 10 is an enlarged longitudinal cross section of a non-conductive monofilament having a segment coated with a conductive coating joined to a region coated with a uniform resistive coating.

Referring now to FIG. 10, an enlarged representation in cross section of the linear variable potential ion guide 20 is illustrated. Variable potential ion guide 20 comprises a non-conductive support element such as a nylon or other non-conductive monofilament 30 of approximately two millimeter diameter coated on its exterior along a resistive region 36 with a uniform resistive coating 38. It is found that use of METECH 8061 resistive polymer manufactured by Metech, Inc. of Elverson, Pa., U.S.A. as a coating material provides a uniform resistive coating 38 of sufficient resistance, namely about one megohm per centimeter.

Variable potential ion guide 20 may be joined to a conductive segment 34 provided with a conductive coating 32, such as METECH 6106 conductive polymer, also manufactured by Metech, Inc. of Elverson, Pa. The conductive segment 34 of monofilament 30 permits a homogeneous potential to be maintained along conductive segment 34. This conductive segment 34 may serve as the fixed potential electrostatic particle guide 12 for use in the drift region 10 of the device illustrated in FIGS. 5, 6.

The uniform resistive coating 38 of variable potential ion guide 20 creates a uniform potential gradient along resistive region 36 from its high potential end 40 to the junction 42 of resistive region 36 with conductive segment 34.

Alternatively the resistive coating 38 may be applied at differing thicknesses along the length of the variable potential ion guide 20 such that the resistive gradient along variable potential ion guide 20 may be non-linear. Further, conductive coatings 32 may be applied intermittently along monofilament 30 to create segments therealong where no potential gradient would exist when a potential is applied to high potential end 40 of variable potential ion guide 20. Many variations of the resistive coating 38 and the arrangements of conductive regions 34 and resistive regions 36 may be created when such structure would produce a desired potential gradient along the variable potential ion guide 20.

As an alternative embodiment to the resistive region 36 of variable potential ion guide 20, a single filament of semiconductor material or a series of resistors could be used as variable potential ion guide 20.

Figure 7:
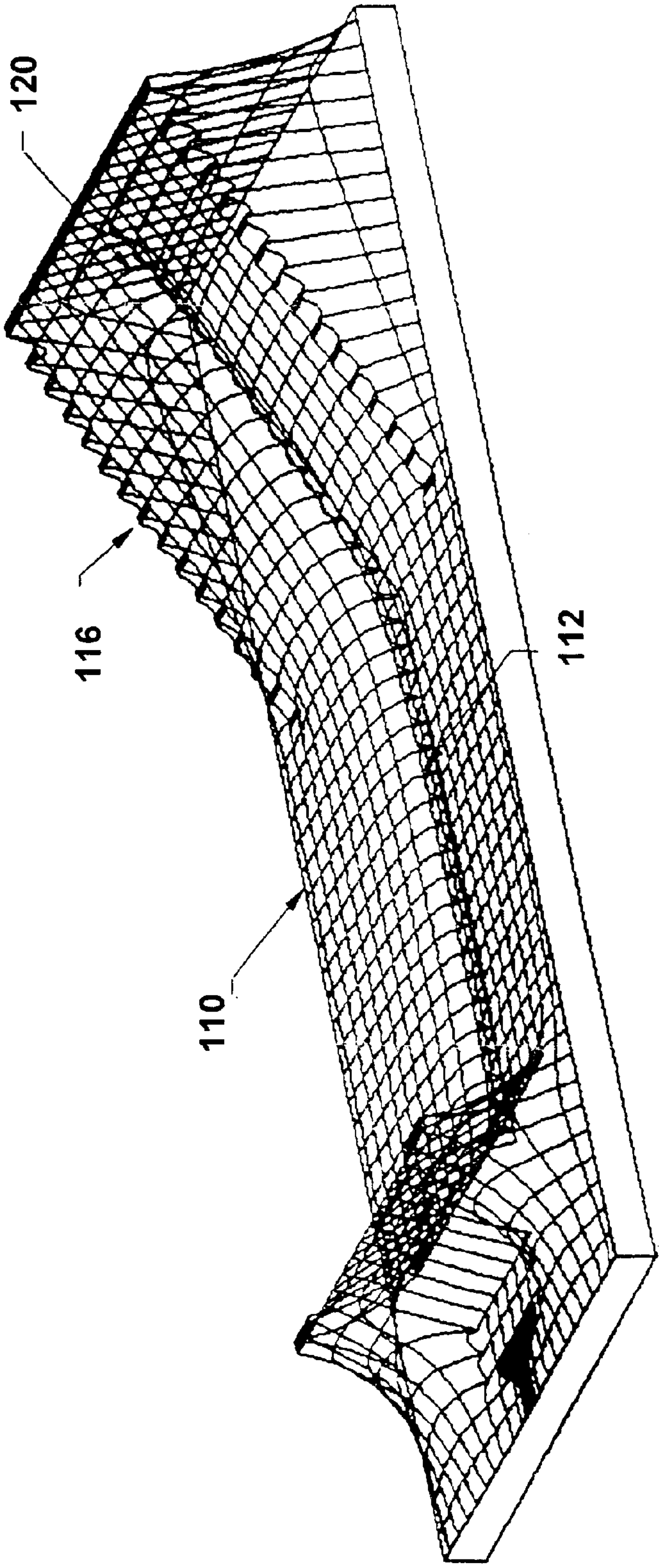
FIG. 7 is a graphical illustration of the potential energy surface generated by the electrodes illustrated in FIG. 5.

If a voltage difference is placed between the two ends of the variable potential ion guide 20, a potential gradient defined by the resistance of the variable potential ion guide 20 will be created. The resultant gradient field can then be used in a mass spectrometer to guide ions through a constantly changing potential field as graphically illustrated in FIG. 7, where ramp region 116 corresponds to the potential surface encountered by ions 4 in guided reflectron region 16 and generally planar region 110 graphically illustrates the potential within the drift region 10. It is seen that a trough 112 is created in planar region 110 because of the homogeneous charge along homogeneous electrostatic particle guide 12. The variable potential ion guide 20 creates a sluice 120 within ramp region 116.

The varying potentials along variable potential ion guide 20 serve to attract ions in the guided reflectron region 16 toward the axis of guided reflectron region 16 and thereby increases the yield of ions 4 reaching the detector 24 which detects arrival of ions 4 and couples arrival data to the timing device 26.

It is important to note that the field lines created using the variable potential ion guide 20 create a potential field that is lowest in the center of the guided reflectron region 16, constantly redirecting the ions 4 back towards the center of the flight axis. This control of the ion trajectory while in a nonhomogeneous electric field increases the efficiency of transmitting ions to the detector and therefore increases the efficiency of ion detection. This increase of efficiency increases the sensitivity of the instrument and therefore reduces the limits to detection.

EXAMPLE

Figure 8:
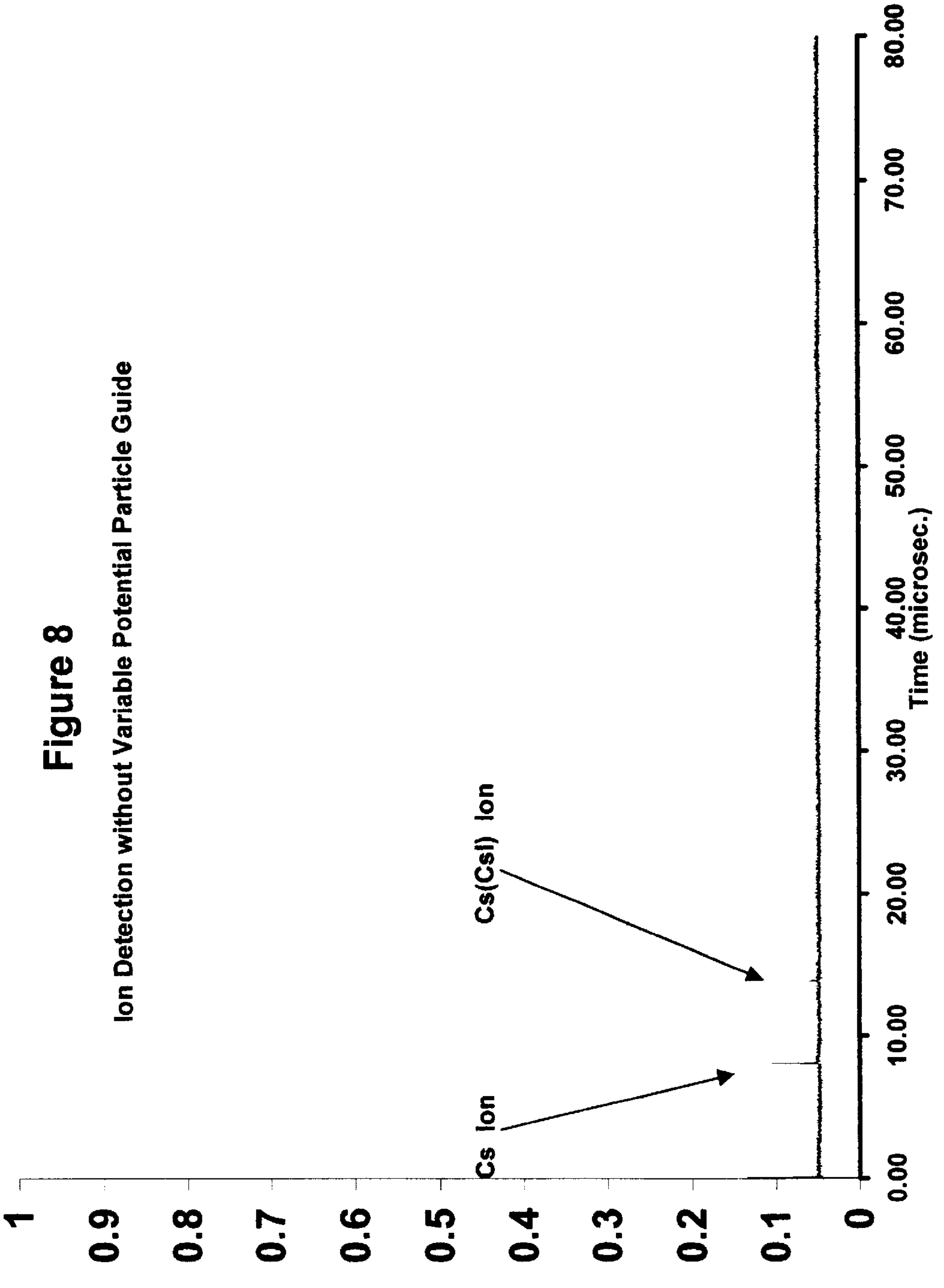
FIG. 8 is a graphical representation of the yield of Cs and CsI ions detected by a time-of-flight mass spectrometer employing a static reflectron.
Figure 9:
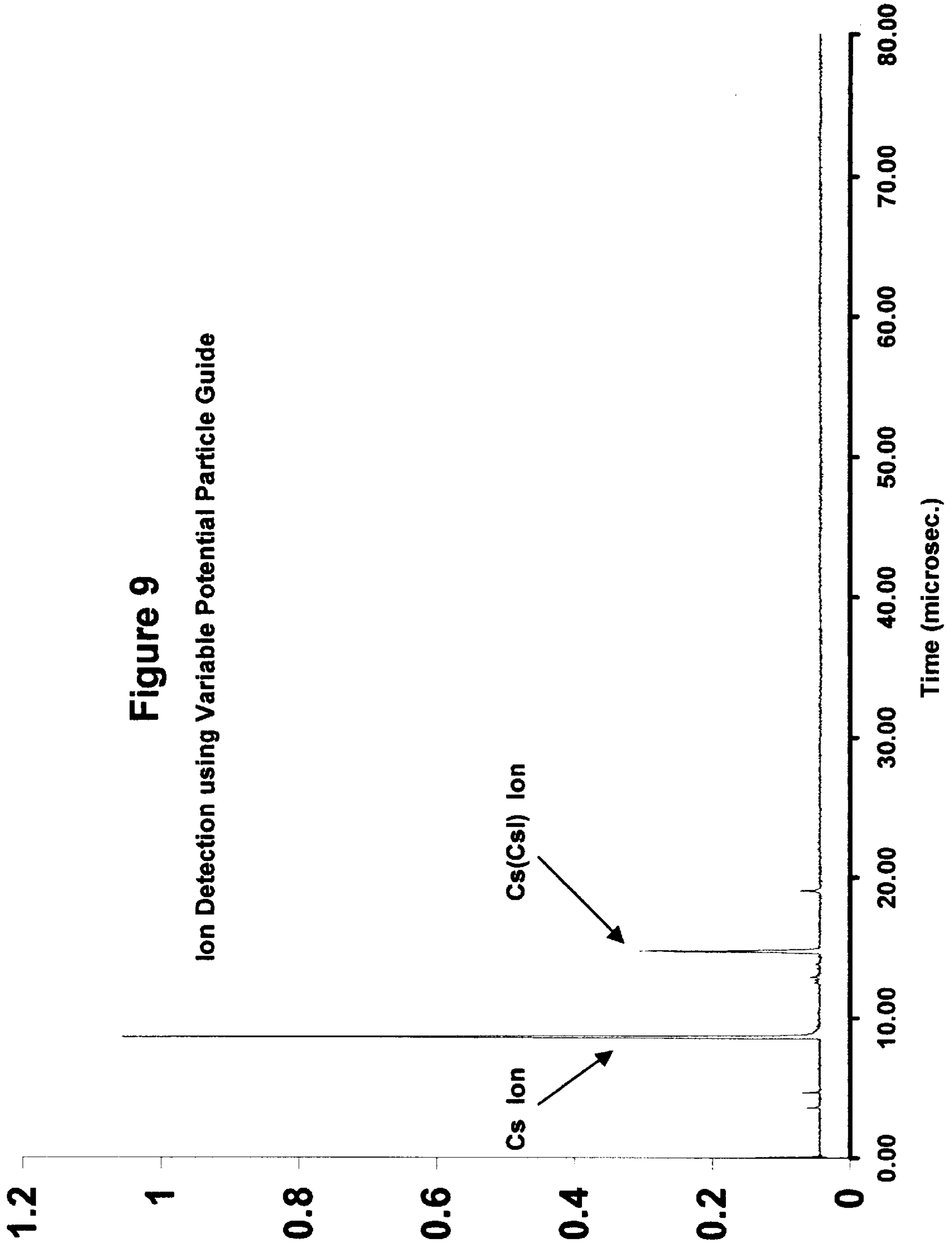
FIG. 9 is a graphical representation of the yield of Cs and CsI ions detected by a time-of-flight mass spectrometer employing a static reflectron and equipped with the variable potential ion guide of the present invention.

Shown in FIGS. 8 and 9 are the time-of-flight mass spectra of Cesium ion cluster ions collected using the same time-of-flight mass spectrometer with and without use of variable potential ion guide 20. In this comparison, the effects of the variable electrostatic particle guide 20 are evaluated. When a voltage was applied to the variable potential ion guide 20 creating the potential surface illustrated in FIG. 7, a much higher ion signal resulted as shown in the graph of FIG. 9. Use of the potential field created by the variable potential ion guide 20 clearly resulted in an increase of transmission efficiency of more than an order of magnitude, increasing the sensitivity of the instrument and lowering the limits to detection.

We claim:

1. An ion guide for a time-of-flight mass spectrometer having a reflectron and a drift region, comprising
an elongate small diameter support filament of non-conductive material,
the support filament having a resistive coating fixed along at least a portion of its length within the reflection,
the support filament disposed substantially coaxially within the reflectron,
said support filament having a high potential end coupled to a voltage,
said support filament having a lower potential end opposing the high potential end thereof.

2. The ion guide of claim 1 wherein
said support filament is nylon monofilament.

3. The ion guide of claim 2 wherein
said support filament has a diameter of approximately two millimeters or less.

4. The ion guide of claim 1 wherein
said resistive coating is uniform along said at least a portion of the length of said support filament.

5. The ion guide of claim 1 wherein
said resistive coating is a resistive polymer.

6. The ion guide of claim 5 wherein
said resistive coating has a resistance of approximately one megohm per centimeter.

7. The electrode of claim 1 wherein
said support filament has a conductive segment joined to said at least a portion of its length having the resistive coating thereon,
the conductive segment comprising a conductive polymer coating fixed to said support filament.

8. A time-of-flight mass spectrometer comprising
an evacuated elongate tube comprising a source region, an ion drift region, a reflectron and a detector,
the reflectron spaced apart from the source region by the ion drift region,
said reflectron coaxial with said ion drift region,
the reflectron comprising at least two spaced apart coaxial electrodes,
said at least two electrodes having static charges thereon,
an elongate ion guide disposed substantially along the axis of said reflectron,
the ion guide comprising
an elongate small diameter non-conductive support filament,
a resistive coating fixed to the support filament along at least a portion of its length within the reflectron,
said support filament having a high potential end coupled to a voltage,
said support filament having a lower potential end opposing the high potential end thereof.

9. The time-of-flight mass spectrometer of claim 8
said ion guide has a conductive segment therealong,
said conductive segment extending from said at least a portion of the length of the support filament having said resistive coating thereon,
said conductive segment including said low potential end of said support filament.

10. The time-of-flight mass spectrometer of claim 9
said conductive segment extending into said drift region along the axis thereof.

11. The ion guide of claim 8 wherein
said support filament is nylon monofilament.

12. The ion guide of claim 11 wherein
said support filament has a diameter of approximately two millimeters or less.

13. The ion guide of claim 8 wherein
said resistive coating is uniform along said at least a portion of the length of said support filament.

14. The ion guide of claim 8 wherein
said resistive coating is a resistive polymer.

15. The ion guide of claim 14 wherein
said resistive coating has a resistance of approximately one megohm per centimeter.

16. A time-of-flight mass spectrometer comprising a drift region and a reflectron,
an elongate ion guide disposed substantially coaxially within said reflectron, the ion guide having a first end and a second end,
said ion guide comprising a resistive electrode,
whereby a potential gradient is present along the resistive electrode when a potential source is coupled to the first end thereof.

17. The time-of-flight mass spectrometer of claim 16 wherein
the ion guide comprises an elongate linear filament having a resistive coating along at least a portion of the length thereof.

18. The time-of-flight mass spectrometer of claim 16 wherein
a conductive elongate electrode is joined to the ion guide,
the conductive elongate electrode disposed coaxially within the drift region of the time-of-flight mass spectrometer.

19. An ion guide for a time-of-flight mass spectrometer having a reflectron and a drift region, comprising
an elongate electrode disposed substantially coaxially within the reflectron,
the electrode being resistive along at least a portion thereof,
said elongate electrode having a high potential end coupled to a voltage,
said elongate electrode having a lower potential end opposing the high potential end thereof.

20. The ion guide of claim 19 wherein
the elongate electrode comprises a series of segments,
the segments comprising resistive segments and conductive segments.

* * * * *

UNITED STATES PATENT AND TRADEMARK OFFICE

CERTIFICATE OF CORRECTION

PATENT NO. : 6,657,190 B2
DATED : December 2, 2003
INVENTOR(S) : Hanson et al.

It is certified that error appears in the above-identified patent and that said Letters Patent is hereby corrected as shown below:

Column 7,
Line 27, delete "reflection" and substitute therefor -- reflectron --.

Column 8,
Line 7, after "8" insert -- wherein --.
Line 14, after "9" insert -- wherein --.

Signed and Sealed this

Twentieth Day of April, 2004

JON W. DUDAS
*Acting Director of the United States Patent and Trademark Office*